(12) United States Patent
Uslontsev et al.

(10) Patent No.: US 7,624,025 B2
(45) Date of Patent: *Nov. 24, 2009

(54) METHODS AND SYSTEMS FOR SUPPORTING THE PRODUCTION OF SHIPPING LABELS

(75) Inventors: Aleksandr Uslontsev, Seattle, WA (US); Rafael Zimberoff, Seattle, WA (US); Stanislav Tugushev, Seattle, WA (US)

(73) Assignee: Z-Firm, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/474,159

(22) Filed: May 28, 2009

(65) Prior Publication Data

US 2009/0234694 A1 Sep. 17, 2009

Related U.S. Application Data

(63) Continuation of application No. 12/347,660, filed on Dec. 31, 2008, and a continuation-in-part of application No. 12/169,509, filed on Jul. 8, 2008, which is a continuation-in-part of application No. 11/952,561, filed on Dec. 7, 2007, now Pat. No. 7,409,353.

(60) Provisional application No. 61/019,208, filed on Jan. 4, 2008.

(51) Int. Cl.
*G06Q 30/00* (2006.01)
(52) U.S. Cl. .......................................................... 705/1
(58) Field of Classification Search ...................... 705/1
See application file for complete search history.

(56) References Cited

U.S. PATENT DOCUMENTS

| 5,956,483 | A | 9/1999 | Grate et al. |
| 5,992,752 | A | 11/1999 | Wilz, Sr. et al. |
| 6,220,509 | B1 | 4/2001 | Byford |
| 6,394,354 | B1 | 5/2002 | Wilz, Sr. et al. |
| 6,850,986 | B1 | 2/2005 | Peacock |
| 6,961,750 | B1 | 11/2005 | Burd et al. |

(Continued)

OTHER PUBLICATIONS

Korpela, Jukka, "Re: Newsgroup Link tag, How to?" USENET post, alt.html, Jul. 10, 1998.*

(Continued)

*Primary Examiner*—John W Hayes
*Assistant Examiner*—Nathan Erb
(74) *Attorney, Agent, or Firm*—Black Lowe & Graham PLLC

(57) ABSTRACT

Methods and systems for supporting the production of shipping labels are provided. Example embodiments provide a Shipment Management System ("SMS"), which facilitates the production of shipping labels. The SMS may be configured to generate a shipping uniform resource identifier ("URI") that identifies a shipping protocol and includes shipment information and post-back information. The shipping URI may be provided to a shipping label module configured to produce a shipping label in accordance with the shipping protocol by outputting a shipping label based on the shipment information, and automatically posting information about the producing of the shipping label to a code module identified by the post-back information. This abstract is provided to comply with rules requiring an abstract, and it is submitted with the intention that it will not be used to interpret or limit the scope or meaning of the claims.

20 Claims, 11 Drawing Sheets

U.S. PATENT DOCUMENTS

| | | | |
|---|---|---|---|
| 7,076,449 | B2 | 7/2006 | Tsunenari et al. |
| 7,191,158 | B2 | 3/2007 | Ogg et al. |
| 7,225,400 | B2 | 5/2007 | Beezer et al. |
| 7,266,513 | B2 | 9/2007 | Chalmers et al. |
| 2002/0010689 | A1 | 1/2002 | Tibbs et al. |
| 2002/0032573 | A1 | 3/2002 | Williams et al. |
| 2002/0032612 | A1 | 3/2002 | Williams et al. |
| 2002/0087548 | A1 | 7/2002 | Tasalloti |
| 2003/0004830 | A1 | 1/2003 | Frederick |
| 2003/0026620 | A1 | 2/2003 | Gallivan |
| 2004/0220845 | A1 | 11/2004 | Malapitan |
| 2005/0038758 | A1 | 2/2005 | Hilbush et al. |
| 2005/0060165 | A1 | 3/2005 | Knight et al. |
| 2005/0071244 | A1 | 3/2005 | Phillips et al. |
| 2005/0114221 | A1 | 5/2005 | Walters et al. |
| 2005/0114222 | A1 | 5/2005 | Mundy |
| 2005/0137937 | A1 | 6/2005 | Njo et al. |
| 2005/0138469 | A1 | 6/2005 | Ryan, Jr. et al. |
| 2005/0171791 | A1 * | 8/2005 | Chimenti et al. ............ 705/1 |
| 2006/0004910 | A1 | 1/2006 | Burd et al. |
| 2006/0282271 | A1 | 12/2006 | Ananda et al. |
| 2006/0294196 | A1 | 12/2006 | Feirouz et al. |
| 2007/0055639 | A1 | 3/2007 | Garvey et al. |
| 2007/0100967 | A1 | 5/2007 | Smith et al. |
| 2007/0174213 | A1 | 7/2007 | Whitehouse et al. |

OTHER PUBLICATIONS

Clark, "Building a better supply," Chain Store Age, 2002, 4 pages, vol. 78, No. 2.

Hoffman, P. et al., "The mailto URL scheme," RFC 2368, The Internet Society, 1998, 9 pages, downloaded on Mar. 24, 2008 from http://www.Ietf.org/rfc/rfc2368.

Hoffman, P., "The telnet URL scheme," RFC4248, The Internet Society, 2005, 4 pages, downloaded on Mar. 24, 2008 from http://www.Ietf.org/rfc/rfc4248.

Masinter, L. et al., "Guidelines for new URL Schemes," RFC2718, The Internet Society, 1999, downloaded on Mar. 24, 2008 from http://www.Ieft.org/rfc/rfc2718.

Obasanjo, D., "The feed URI Scheme (Pre-Draft)," Network Working Group, Dec. 2003, 2 pages., downloaded Mar. 24, 2008 from http://www.25hoursaday.com/draft-obsanjo-feed-URI-scheme-02.html.

Registry of URI Schemes, Internet Assigned Numbers Authority, 2006, downloaded Oct. 8, 2007 from http://www.iana.org/assignments/uri-schemes.html.

Vingralek, R. et al., A Transparent Replication of HTTP Service, 15th International Conference on Data Engineering Proceedings, Mar. 23-26, 1999, p. 97.

"FedEx Shipping Labels:—ShipRush for FedEx Shippers," URL=http://zfirm.com/products/shiprush_fedex.shtml, download date Dec. 6, 2007, 1 page.

ShipRush Product Documentation Excerpts, URL=http://www.zfirm.com/Product_Documentation/ShipRush/_v5-0_FedEx/, download date Dec. 4, 2007, 35 pages.

"ShipRush Product Screen Display," Screen shot from running product.

* cited by examiner

METHODS AND SYSTEMS FOR SUPPORTING THE PRODUCTION OF SHIPPING LABELS

TECHNICAL FIELD

The present disclosure relates to methods and systems for supporting the production of shipping labels and, in particular, to methods and systems for generating and providing uniform resource identifiers that cause shipping labels to be produced on remote computing systems.

BACKGROUND

A number of approaches exist for printing shipping labels using a computer. In one approach, a shipping label is prepared and printed using a stand-alone application executing on a shipper's computing system. Such client-side applications may include document preparation applications, such as word processors or special-purpose shipping label applications. Using a word processor to prepare shipping labels may be an error prone process, as relevant information (e.g., each destination shipping address) may need to be entered manually. In addition, the word processor may not be configured or otherwise capable of preparing bar codes or other machine readable indicia required or preferred by some carrier services.

Special-purpose shipping label applications also suffer from a number of drawbacks. In particular, they are typically limited in their ability to communicate over a network to obtain information relevant to a shipping label (e.g., a recipient address), or to inform other computing systems about a shipping label that has been printed (e.g., for tracking purposes). Furthermore, even if a stand-alone shipping label application has network capabilities, information is exchanged in a potentially non-uniform manner between shipping label applications and remote computing systems. In such cases, the developers of shipping label applications may need to implement multiple diverse mechanisms for communicating with different remote computing systems, such as those provided by different shipping carriers for tracking shipments. Further, some remote computing systems may be unable or unwilling to grant or support access by a special-purpose shipping label application (e.g., based on security concerns, technical considerations, etc.), resulting in reduced functionality for the special-purpose shipping label application.

In other approaches, Web-based server-side shipping label applications have been used. Such applications allow a user to utilize a Web browser to prepare and print shipping labels. Such approaches have the benefit that they may not require the installation of special software on a client machine (aside from a Web browser). However, such approaches may be limited by simple, Web-based user interfaces that restrict the available functionality of the shipping label application. In addition, Web-based shipping label applications may not be able to readily or conveniently access information stored in locations other than those that are accessible to the Web server that provides the shipping label application (e.g., the client machine, computing systems operated by third-parties, etc.). For example, because the shipping label application is a server side application, it may not be able to interact with software (e.g., database systems, address books, etc.) and/or hardware (e.g., printers, disks, etc.) resident on the client machine. Such limitations may result in reduced functionality for the shipping label application, such as poor integration, low quality shipping label output, etc

DETAILED DESCRIPTION

Figure 1:
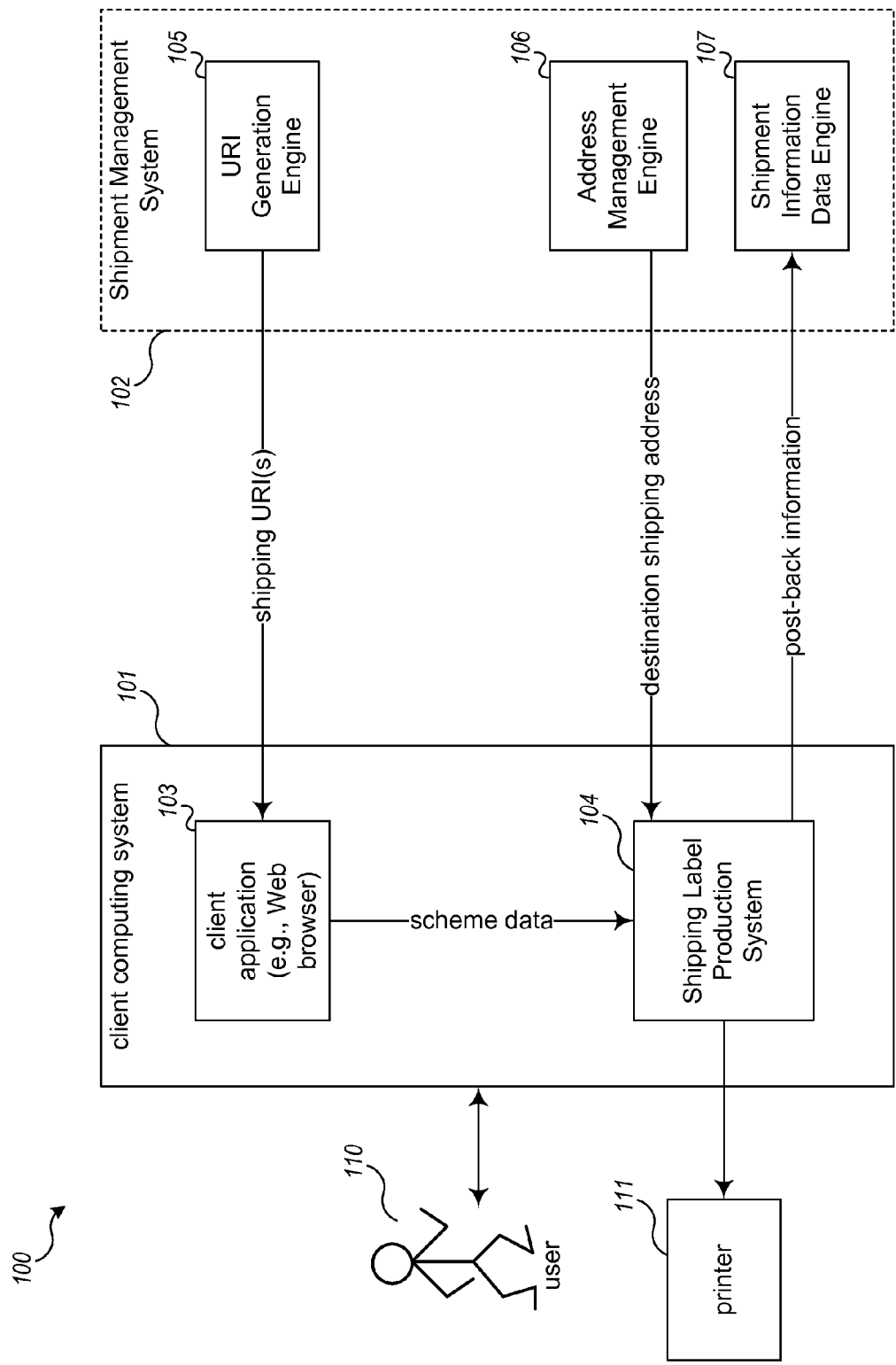
FIG. 1 is an example block diagram of components of an example environment for producing shipping labels using a Shipping Label Production System.

Embodiments described herein provide enhanced computer- and network-based methods, techniques, and systems for producing shipping labels. Example embodiments provide a Shipment Management System ("SMS"), which may interact with one or more Shipping Label Production Systems ("SLPS"), in order to enable users to efficiently perform item shipments by automatically producing shipping labels and recording information about such shipments. An item shipment includes one or more activities related to the transport of an item from one location to another. Such activities may include obtaining and/or providing information about a shipment (e.g., a destination shipping address, a parcel weight and/or size, a tracking number, etc.), outputting a shipping label for the shipment (e.g., an address label, postage indicia, etc.), delivery and/or receipt of the shipment, etc. Items may include any objects that may be transported by a carrier network (e.g., the U.S. Postal Service, Federal Express, a shipping agency, etc.), such as goods (e.g., items purchased by customers), packages, communications (e.g., letters, documents, magazines, flyers, etc.), etc.

In some embodiments, a syntax and semantics for shipping uniform resource identifiers is defined. A shipping uniform resource identifier ("URI") may be generated by an SMS and provided to an SLPS in order to specify actions that that are to be taken by the SLPS to perform a particular item shipment. A shipping URI includes a scheme name that identifies a shipping protocol and that is configured to cause Web browsers or other applications to execute an SLPS to perform activities such as to produce a shipping label. A shipping URI also includes scheme data that is provided by the SMS to the SLPS and that specifies one or more aspects of a particular item shipment. The scheme data may include, for example, a destination shipping address that is to be included in a shipping label for a particular shipment or may include an identifier (e.g., a URI or link) that may be used to determine a destination shipping address or other shipping characteristics. The scheme data may also include an identifier (e.g., another URI) of a code module (e.g., of a Web server) that is configured to store information about shipments, such that the SLPS can provide information about the item shipment to the code module. Alternatively, a single identifier may be used to obtain shipment label information such as an address associated with a particular shipment and to provide information about the item shipment. For example, the SLPS may provide information regarding the printing of a shipping label, a tracking number associated with the shipment, etc. By automatically providing information about the item shipment to the code module, the information may then be made available to other systems and/or users, such as the intended recipient of the item shipment, so the recipient can be notified or otherwise learn that the item has been shipped. In this manner, a shipping URI facilitates the interoperation of disparate computing systems to efficiently perform item shipments. Embodiments of a SLPS are described in detail in U.S. Pat. No. 7,409,353, issued Aug. 5, 2008, entitled "Methods and Systems for Producing Shipping Labels."

FIG. 1 is an example block diagram of components of an example environment for producing shipping labels using a Shipping Label Production System. In particular, FIG. 1 depicts the production of a shipping label by a user 110 in the context of an example Shipping Label Production Environment ("SLPE") 100. In the illustrated embodiment, the SLPE 100 includes a client computing system 101, a Shipment Management System ("SMS") 102, and a printer 111. The client computing system 101 includes a client application (e.g., a Web browser) 103 and a Shipping Label Production System ("SLPS") 104.

The example SMS 102 includes a URI generation engine 105, an address management engine 106, and a shipment information data engine/repository 107. The components of the SMS 102 provide various functions and/or services related to the management of shipments, such as supporting (e.g., facilitating) the production of shipping labels by generating and providing shipping URIs that cause client computing systems to produce shipping labels associated with item shipments. The URI generation engine 105, for example, manages the generation and provisioning (e.g., transmitting, forwarding, sending, etc.) of shipping URIs that may be used to initiate, cause, invoke, or otherwise perform item shipments. The address management engine 106 provides destination shipping addresses and/or other information regarding item shipments in response to requests received from the SLPS 104 and/or other systems/components. The shipment information data engine 107 records (e.g., stores, tracks, etc.) information about item shipments, such as when a label was printed, when a shipment was sent, and/or other details related to a particular shipment. The shipment information data engine 107 may provide additional services related to item shipments, such as providing tracking capabilities to third parties (e.g., item recipients).

Note that although the URI generation engine 105, the address management engine 106, and the shipment information data engine 107 are illustrated as part of the shipment management system 102, no limitations are placed on the location and/or control of components 105-107. In particular, in one embodiment, the shipment management system 102 may be deployed as a single Web server having software modules (e.g., CGI modules, servlets, server-side code modules, etc.) corresponding to each of components 105-107. In another embodiment, components 105-107 are operated under the control of different entities and/or on different computing systems. For example, the URI generation engine 105 may be part of a first Web site that provides an online auction, the address management engine 106 may be an electronic address book situated on the client computing system 101, and the shipment information data engine 107 may be part of a second Web site that provides an interface to one or more carrier services (e.g., United Parcel Service, U.S. Postal Service, etc.). In addition, different and/or additional components may be provided as part of an SMS 102.

In the illustrated example, a user 110 operates the client application 103 to obtain one or more shipping URIs, such as by accessing a Web page provided by the SMS 102. The client application 103 may include any client application configured to process a shipping URI, such as by presenting a user selectable control (e.g., a link) that represents the URI and taking one or more actions in response to a user selection of the control. Such client applications may include, for example, Web browsers, email clients, document preparation applications (e.g., word processors, spreadsheets, etc.), contact managers, news readers, instant messenger clients, etc. The provided Web page may include one or more shipping URIs that are displayed as links or other user interface controls (e.g., buttons) by the client application 103 to the user 110. Each shipping URI includes a scheme name and scheme data. The scheme name of a given shipping URI is configured to cause the client application 103 to provide the scheme data to the SLPS 104 in response to the user's selection of the user interface control representing the URI.

When the user 110 selects (e.g., clicks on) a link or other representation of one of the displayed shipping URIs, the client application 103 provides scheme data from the selected URI to the SLPS 104.

Upon receiving the scheme data, the SLPS 104 uses the scheme data of the selected shipping URI to access the address management engine 106 and obtain a destination shipping address associated with the shipping URI. Then, the SLPS 104 generates a shipping label that includes the destination shipping address and prints the shipping label via the printer 111. Upon printing the shipping label, the SLPS 104 posts information about the printed label to the shipment information data engine/repository 107. Posting information to the shipment information data engine/repository 107 may include providing, sending, transmitting, forwarding information using any protocol or other communication mechanism, such as HTTP, HTTPS, FTP, SMTP, SOAP, etc. The posted information may include, for example, the fact that the label has been printed along with other details related to the shipment, such as package weight, estimated transit time, etc. Other users (e.g., shipment recipients) of the shipment management system 102 or via other permitted systems may then access information about the status of the shipment.

Figure 2:
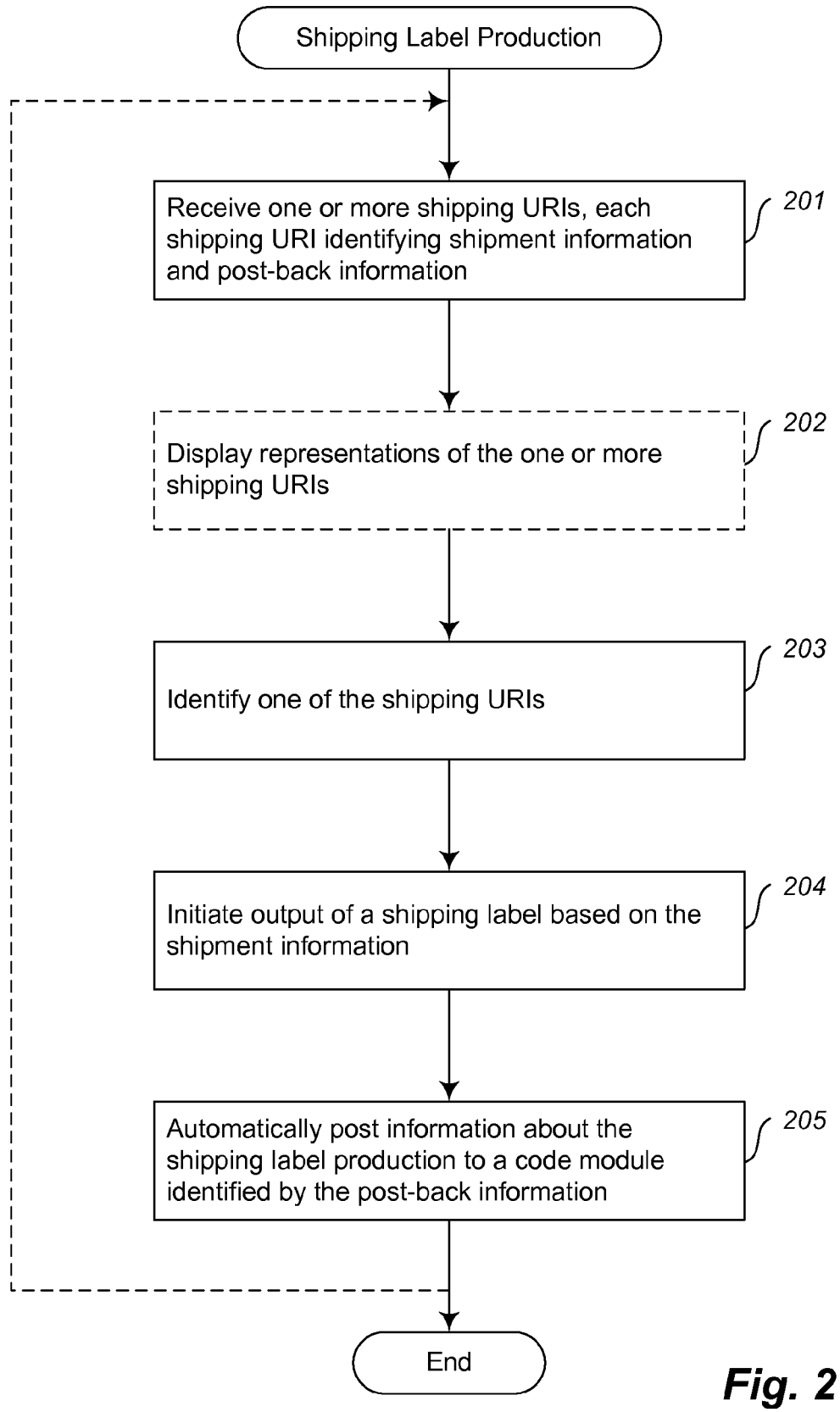
FIG. 2 is an example block diagram of an overview of an example shipping label production process.

FIG. 2 is an example block diagram of an overview of an example shipping label production process. The illustrated process may be performed by one or more components and/or users of the SLPE 100, described with reference to FIG. 1, to produce a shipping label. In particular, the illustrated process demonstrates the production of a shipping label by an SLPS based on information included in a shipping URI that is received from a Web browser, such as client application 103 of FIG. 1.

More specifically, in step 201a Web browser receives one or more shipping URIs that each include information that identifies shipment information and/or post-back information. The shipping URIs may be received from, for example, the URI generation engine 105 of the SMS 102. The shipment information identified by a particular shipping URI may include a destination shipping address and/or a URI or link that may be used to obtain a destination shipping address. For example, the shipment information may include a URI that identifies the address management engine 106 and that may be used by the SLPS 104 to obtain a destination shipping address from the address management engine 106 (FIG. 1). Similarly, the post-back information identified by a particular shipping URI may include a URI that may be used to provide information about a produced shipping label or other details related to an item shipment or may include information that may be used to obtain an address for posting back information. For example, the post-back information may include a URI that identifies the shipment information data engine 107 and that may used by the SLPS 104 to provide information about a shipment to the shipment information data engine 107 (FIG. 1). Example shipping URIs are described with reference to FIGS. 3B and 3C, below. Or, the post-back information may be the address of a file that contains XML data usable to determine the "address" of the shipment information data engine 107. Also, the shipping information and/or post-back information identified by a shipping URI may be identified by a single URI or link, stored in the shipping URI, which is accessed to obtain both the shipment information and/or the post-back information. Other arrangements are possible and contemplated.

In step 202, the Web browser displays representations of the received one or more shipping URIs. Shipping URIs may be represented in various ways, such as links, buttons, or other user-selectable controls. An example Web browser displaying links representing shipping URIs is described with reference to FIG. 3A, below. In some embodiments, step 202 may be omitted. For example, one or more shipping URIs may be processed automatically, in a non-interactive manner, such as by an SLPS that is configured to automatically produce shipping labels based on a received set of shipping URIs (e.g., an SLPS operating in batch or "bulk" mode).

In step 203, one of the shipping URIs is identified. In interactive embodiments, the shipping URI may be identified by a user selection of a corresponding control (e.g., a link, a button, etc.) displayed by the Web browser. In response to such a user selection, the Web browser may initiate execution of an SLPS, and provide the scheme data, including the shipment information and/or the post-back information, of the shipping URI to the SLPS. An example SLPS is described with reference to FIG. 3D, below. In a non-interactive embodiment, the shipping URI may be identified as the next URI of the received one or more shipping URIs, such as when the received URIs are consecutively processed in a loop by the SLPS.

In step 204, the SLPS initiates output of a shipping label based on the shipment information. An example shipping label is described with reference to FIG. 3E, below. Initiating output of a shipping label may include generating a shipping label, such as by creating, updating, or otherwise managing data structures and/or indicators of information about a particular shipment, such as may be stored by a data repository such as a database or file system. In some embodiments, generating the shipping label may include determining a destination shipping address, such as by direct reference to the shipment information (e.g., when the shipment information encodes the address). In other embodiments, the destination shipping address may be determined by interacting with a code module that is configured to provide the destination shipping address (e.g., the address management engine 106 of FIG. 1), or by any other technique for "discovering" an associated destination shipping address. For example, the shipment information may include a URI that identifies a Web server configured to provide a destination shipping address in response to an order number or other identifier. Outputting a shipping label may further include printing (e.g., to a laser printer), presenting (e.g., displaying), communicating (e.g., sending, transmitting, etc.), or otherwise forwarding the shipping label.

In step 205, the SLPS automatically posts information about the shipping label production to a code module identified by the post-back information. The code module may be a shipment information data engine 107 provided by a remote Web server, as described with reference to FIG. 1. Posting information about the shipping label production may include notifying the code module that the shipping label has or has not been successfully produced. For example, when a printer communicatively coupled to the SLSP successfully prints the shipping label, the SLSP may notify the code module of various aspects of the shipping label production, for example a tracking number, a shipment identifier, date and/or time (e.g., of printing), parcel dimensions and/or weight, etc. In some embodiments, posting information about shipping label production may include determining the code module for posting information, such as by direct reference to the shipment information data engine (e.g., when the post-back information encodes the address). In other embodiments, the code module for posting information about shipping label production may be determined by interacting with a code module, file, or data that is configured to provide the location/identification of the code module (e.g., the shipment information data engine 107 of FIG. 1), or by any other technique for "discovering" a code module. For example, the scheme data may include a URI that identifies a Web server configured to provide a file that contains information that can be used to obtain the location of a code module.

After step 205, the process ends, or optionally returns to step 201, such as when the SLPS is operating in a batch mode where it processes multiple shipping URIs automatically.

FIGS. 3A-3F are example diagrams illustrating aspects of an example shipping label production process. In particular, FIGS. 3A-3F illustrate a scenario in which a user operates a Web browser to select a shipping URI, along with the corresponding production of a shipping label via a Shipping Label Production System. In the example of FIGS. 3A-3F, the production of a shipping label is described in the context of an online, electronic commerce application, such as an auction Web site. In particular, shipping URIs and an SLPS are used to print a shipping label that is to be used to send to a recipient an item ordered by a customer. This example is not intended to limit the described techniques to the production of shipping labels for items ordered in the context of electronic commerce transactions. In particular, the described techniques may be used to produce shipping labels for other purposes, such as communication (e.g., sending a letter or other communication to a person or other entity), advertising (e.g., direct mail marketing), sales force automation, customer relationship management, etc.

Figure 3A:
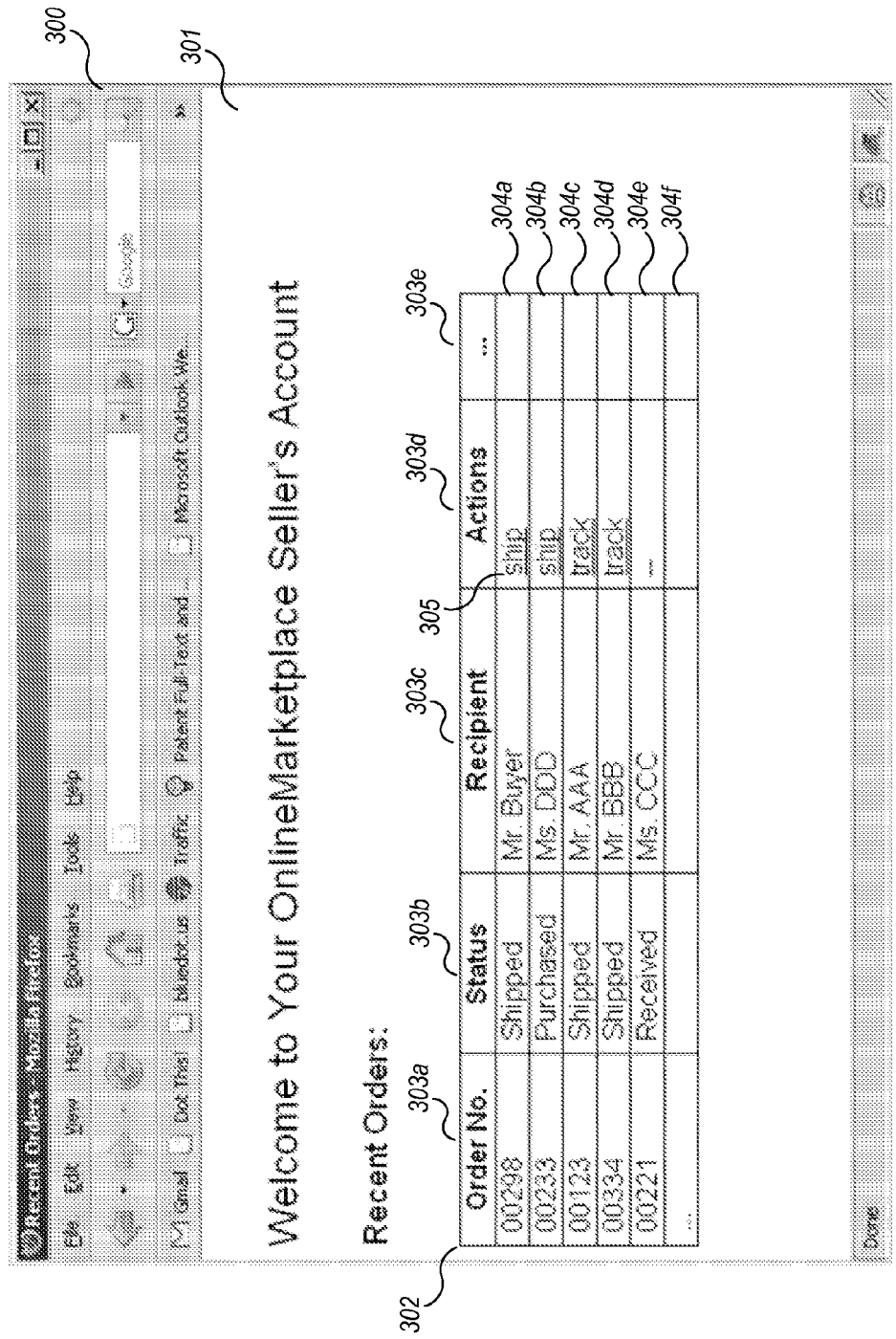
FIGS. 3A-3F are example screen displays and diagrams illustrating aspects of an example shipping label production process.

FIG. 3A depicts a Web browser displaying an example order management application provided by a Web server. In particular, the Web browser 300 is illustrated displaying an order management application 301 that may be used by, for example, a user or other entity that sells items to remote customers, such as via an online marketplace, an auction Web site, etc. When a customer purchases an item, it may be recorded as an order that is managed by the order management application 301. Managing orders may include querying, shipping, tracking, or otherwise administering the process of transferring possession of ordered items to recipients.

In the illustrated example, the order management application 301 displays a table 302 of recent orders that have been placed by various customers. The table is organized into rows 304a-304f that each represent one order. Each row includes fields 303a-303e that each contain information about one aspect of the associated order. In particular, each order includes an order number 303a, an order status 303b, a recipient 303c, and one or more actions 303d. The actions listed in field 303d may be presented as user-selectable controls (e.g., links, buttons, etc.), such that a user may invoke associated functionality to perform the action. Field 303e indicates that in other embodiments, orders may have a greater or lesser number of associated fields.

For example, fields (columns) 303a-303d of order (row) 304a indicate that the illustrated order has an order number of 00298, that the order has been purchased and is to be shipped to Mr. Buyer, and that the order may be shipped by selecting (e.g., clicking on) a link 305 named "ship" in field 303d. In the illustrated example, the user selects the link 305, and in response, the Web browser 300 initiates execution of an SLPS, as described with reference to FIG. 3D, below.

Figure 3B:
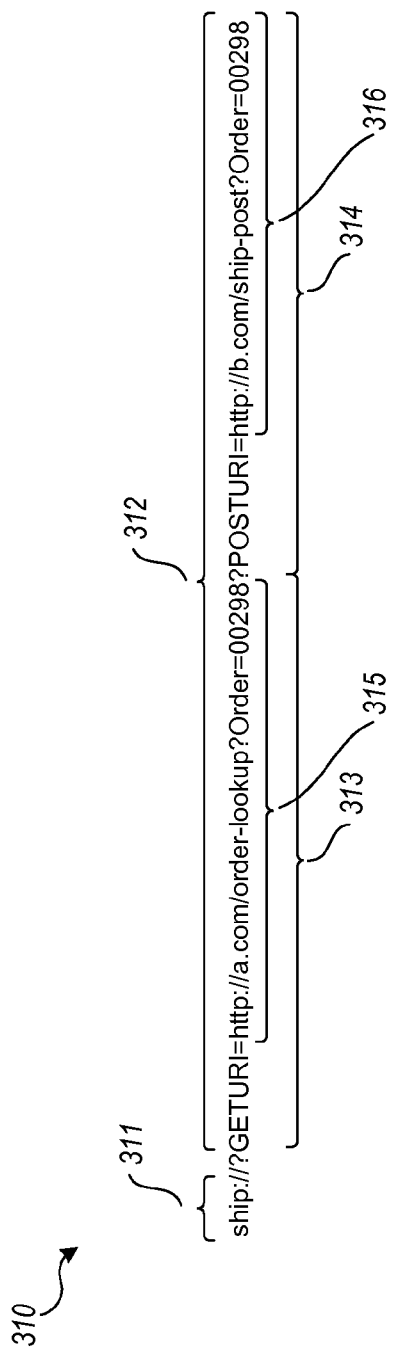
Figure 3C:
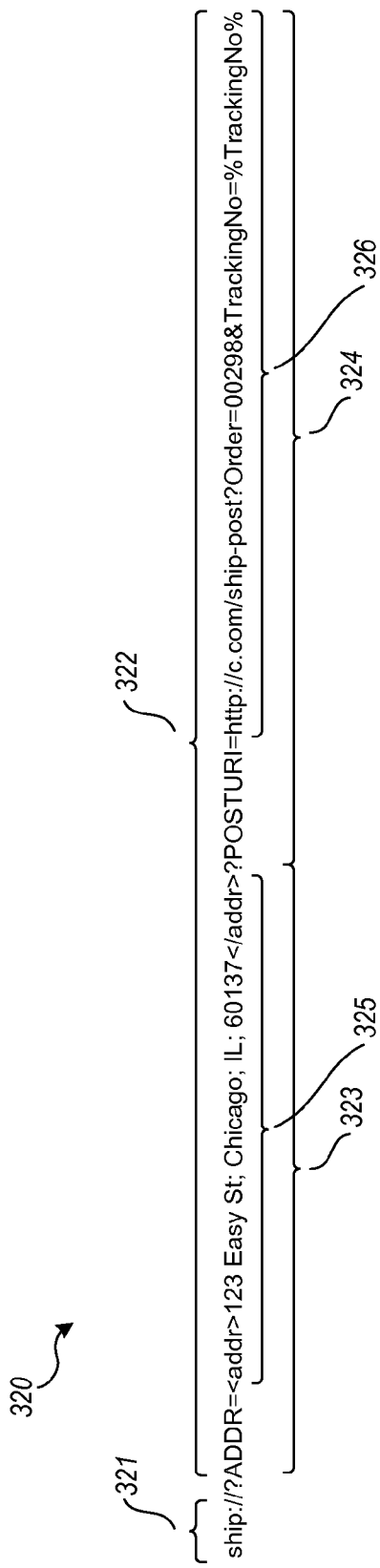

FIGS. 3B-3C depict example shipping URIs. The illustrated shipping URIs may be provided by, for example, the SMS 102 to the client application 103, as described with reference to FIG. 1. One of the illustrated shipping URIs may be, for example, presented as the link 305 described with reference to FIG. 3A. A shipping URI specifies actions and/or properties with respect to a particular item shipment, as defined by a shipping protocol implemented by the SLPS. An example shipping protocol is described in detail with respect to Tables 1-3, below.

FIG. 3B depicts an example shipping URI. Shipping URI 310 comprises a scheme name 311 and scheme data 312. The scheme name 312 identifies a shipping protocol and is configured to cause a Web browser or other client application to initiate execution and/or provide the scheme data 312 to an SLPS. The SLPS, in turn, produces a shipping label based on the information contained in the scheme data 312, as described with reference to FIG. 3D, below.

The scheme data 312 of FIG. 3B comprises shipment information 313 and post-back information 314. The shipment information 313 includes a URI 315 that may be used by the SLPS to obtain a destination shipping address. The URI 315 may identify a code module, such as the address management engine 106 (FIG. 1), that is configured to provide a destination shipping address in response to a received address identifier. In the illustrated example, the URI 315 includes an order identifier ("00298") that corresponds to the order number of field 303a of order 304a of FIG. 3A. The SLPS may utilize the URI 315 to obtain, for example via HTTP ("HyperText Transport Protocol"), a destination shipping address corresponding to or otherwise associated with order number 00298. The obtained destination shipping address may then be used to generate a corresponding shipping label for the associated order. In other embodiments, the URI 315 may be used to obtain other kinds of information about a pending item shipment. For example, the SLPS may utilize the URI 315 to verify the correctness of a destination shipping address or to obtain an identity of a shipping carrier.

The post-back information 314 includes a URI 316 that may be used by the SLPS to provide information about the shipping label production to a code module, such as the shipment information data engine 107 (FIG. 1), that is configured to track or otherwise record information about shipments that have been processed by the SLPS. In the illustrated example, the URI 316 includes the same order identifier described with respect to URI 315. The SLPS may utilize the URI 316 to provide, for example via HTTP, information about the shipping label production to the shipment information data engine. For example, it may provide an indication that the shipment corresponding to order 00298 has been shipped, an indication that a shipping label for the order has been produced, etc. In some embodiments, the shipment information 313 and the post-back information 314 is combined (not shown). In such a scenario, a single URI, for example, URI 315, may be used to obtain (however indirectly) both a destination shipping address (and/or other shipment information) and post-back information.

FIG. 3C depicts another shipping URI. Shipping URI 320 comprises a scheme name 321 and scheme data 322. The scheme data 322 comprises shipment information 323 and post-back information 324. The shipment information 323 differs from the shipment information 313 of FIG. 3B in that the shipment information 323 includes a destination shipping address 325 formatted as an XML string. Accordingly, in this example, the SLPS may obtain the destination shipping address 325 directly from the shipment information 323, without making a request to a code module as described with reference to FIG. 3B, above.

In some embodiments, post-back information may include indications (such as string parameters) of one or more data items that are to be provided by the SLPS to the shipment information data engine. In the illustrated example of FIG. 3C, the post-back information 324 includes a URI 326 that includes an indication that the SLPS is to provide a tracking number associated with the item shipment and/or shipping label. In this example, data items that are to be provided by the SLPS are specified as field names surrounded by "%" characters (e.g., "% TrackingNo %"). When the SLPS processes the URI 326, prior to interacting with the shipment information data engine, the SLPS replaces indicated fields with corresponding data items that are associated with the item shipment. Additional data items that may be specified are described with reference to Table 3, below.

Figure 3D:
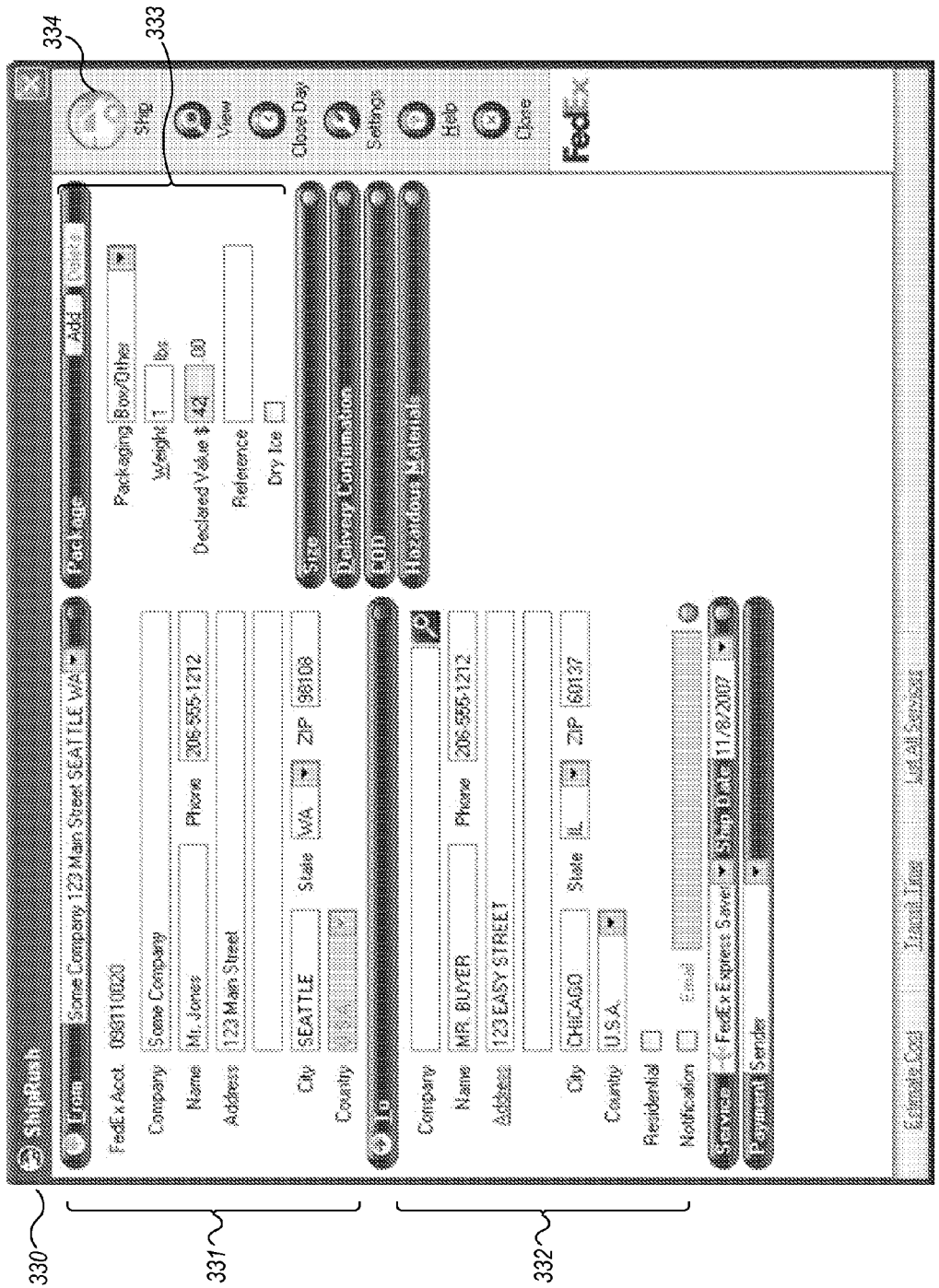

FIG. 3D depicts a user interface of an example Shipping Label Production System. As discussed above, the Shipping Label Production System ("SLPS") 330 may be executed by a Web browser upon user selection of a link representing a shipping URI, such as shipping URI 310 discussed with reference to FIG. 3B. The Web browser may be configured to execute the SLPS 330 as a protocol handler for a shipping protocol identified by the scheme name of a shipping URL. Although the SLPS 330 is here illustrated as an executable that is independent from the Web browser, in other embodiments it may be implemented as a "plug-in" module executing within the context of the Web browser.

The SLPS 330 includes user-selectable controls (e.g., text fields, drop down menus, checkboxes, etc.) for specifying various information related to a particular item shipment, such as sender information 331, recipient information 332, and package information 333. The SLPS 330 may automatically populate at least some of the controls based on shipment information received as part of a shipping URI. In one example embodiment, based on a URI (e.g., the URI 315) received by the SLPS 330 as part of the shipment information (e.g., shipment information 312), the SLPS 330 requests a destination shipping address from an address management engine. Upon receiving the destination shipping address, the SLPS 330 then populates (e.g., fills in) one or more of the fields of the recipient information 332. The SLPS 330 may also automatically populate other fields, such as those in the sender information 331, such as based on previously recorded user preferences and/or settings. In the illustrated embodiment, the user of the SLPS 330 may provide additional information about the shipment, such as parcel information 333 (e.g., shipping weight, value, etc.).

The SLPS 330 also includes a ship control 334 that may be selected by a user to initiate the output of a shipping label corresponding to the specified item shipment. In some embodiments, the output of the shipping label may be delayed until a later time, such as the end of a workday, so that multiple shipping labels may be output in a batch manner.

Figure 3E:

FIG. 3E depicts an example shipping label produced by an example Shipping Label Production System. The shipping label 340 includes a sender information portion 341, a recipient information portion 342, along with various other elements, such as a machine readable indicator 343. The recipient information portion 342 includes text corresponding to the recipient information 332 described with respect to FIG. 3D.

Figure 3F:
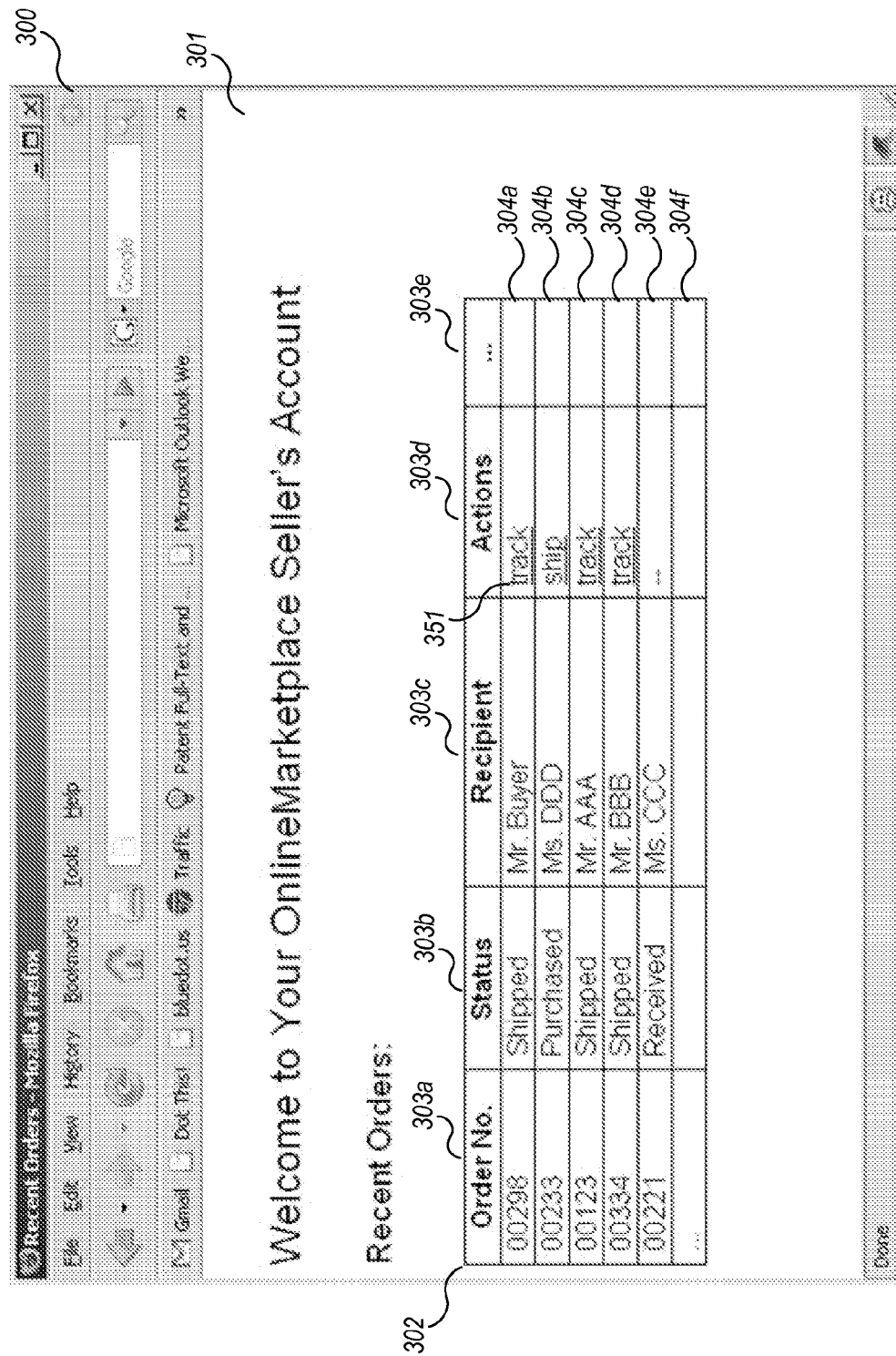

FIG. 3F depicts the user interface of an example order management application after the shipping label shown in FIG. 3E has been produced. The Web browser 300 is illustrated displaying the example order management application 301 described with reference to FIG. 3A. Here, the order management application 301 displays the table 302 in an updated state, after a shipping label for the order of row 304a has been produced, as described with reference to FIGS. 3A-3E, above. In particular, the "ship" link 305 shown in FIG. 3A has here been replaced with a "track" link 351, because the SLPS has posted information about the item shipment back to the order management application 301, such as the printing of the shipping label, a parcel tracking number, etc.

In the illustrated embodiment, the order management application 301 has been displayed in an updated state, for example, in response to a user request (e.g., a page reload) to a Web server that provides the order management application 301. However, in other embodiments, the Web server may automatically update or refresh the order management application 301, for example in response to a posting of information about the item shipment received from the SLPS.

Although certain terms are used primarily herein, other terms could be used interchangeably to yield equivalent embodiments and examples. For example, it is well-known that equivalent terms in the shipping field and in other similar fields could be substituted for many of the terms used here. Specifically, the term "shipping label" can be used interchangeably with "ship label," "address label," "mailing label," etc. Likewise, the term "label" can be used interchangeably with "indicia," "marker," "tag," etc. Furthermore, the term "Uniform Resource Identifier" can be used interchangeably with "Uniform Resource Locator." In addition, terms may have alternate spellings which may or may not be explicitly mentioned, and all such variations of terms are intended to be included.

Example embodiments described herein provide applications, tools, data structures and other support to implement a Shipping Label Production System to be used for producing shipping labels. Other embodiments of the described techniques may be used for other purposes. For example, many applications could incorporate the technique of using a URI to cause a Web browser or other code module to initiate an action (e.g., loading of a file, output of a graphic, transmission of a data item, etc.) and perform a corresponding post back of information about performance of the action. Some example applications and/or uses include link tracking, report generation, address book management, contact management, etc. In general, these techniques are applicable to any application that could benefit from performing a designated action followed by a post back of information about the performed action.

In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 4:
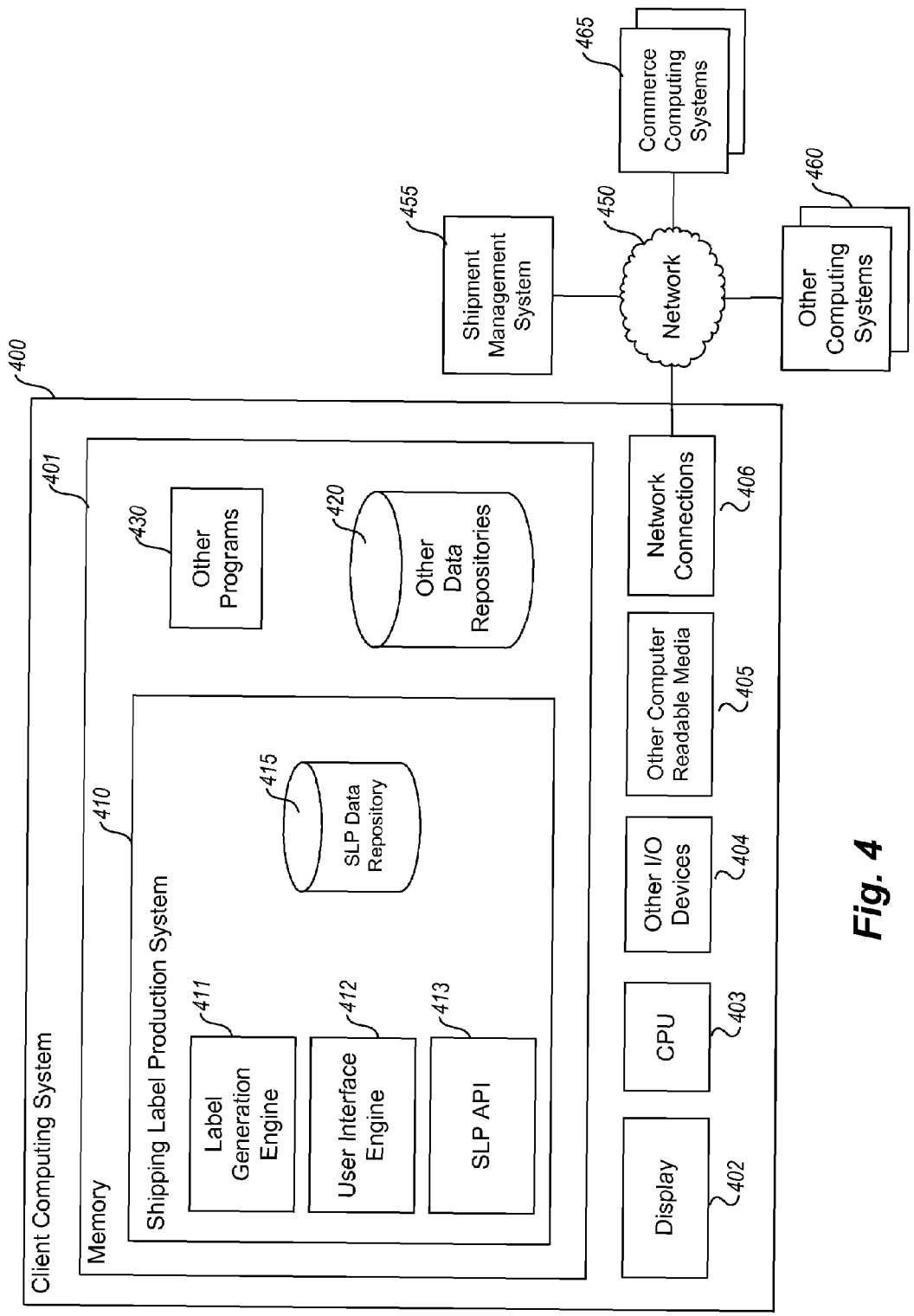
FIG. 4 is an example block diagram of a computing system for practicing embodiments of a Shipping Label Production System.

FIG. 4 is an example block diagram of a computing system for practicing embodiments of a Shipping Label Production System. Note that a general purpose or a special purpose computing system may be used to implement an SLPS. Further, the SLPS may be implemented in software, hardware, firmware, or in some combination to achieve the capabilities described herein.

The computing system 400 may comprise one or more server and/or client computing systems and may span distributed locations. In addition, each block shown may represent one or more such blocks as appropriate to a specific embodiment or may be combined with other blocks. Moreover, the various blocks of the SLPS 410 may physically reside on one or more machines, which use standard (e.g., TCP/IP) or proprietary interprocess communication mechanisms to communicate with each other.

In the embodiment shown, computer system 400 comprises a computer memory ("memory") 401, a display 402, one or more Central Processing Units ("CPU") 403, Input/Output devices 404 (e.g., keyboard, mouse, CRT or LCD display, etc.), other computer-readable media 405, and network connections 406. The SLPS 410 is shown residing in memory 401. In other embodiments, some portion of the contents, some of, or all of the components of the SLPS 410 may be stored on or transmitted over the other computer-readable media 405. The components of the SLPS 410 preferably execute on one or more CPUs 403 and manage the production of shipping labels, as described herein. Other code or programs 430 (e.g., a Web browser) and potentially other data repositories, such as data repository 420, also reside in the memory 410, and preferably execute on one or more CPUs 403. Of note, one or more of the components in FIG. 4 may not be present in any specific implementation. For example, some embodiments embedded in other software many not provide means for user input or display.

In a typical embodiment, the SLPS 410 includes a label generation engine 411, a user interface engine 412, a shipping label production application program interface ("SLP API") 413, and a shipping label production data repository 415. Other and/or different modules may be implemented. In addition, the SLPS 410 may interact via a network 450 with a shipment management system 455, commerce computing systems 465, and other computing systems 460. Also, the SLP data repository 415 may be provided external to the SLPS 410 as well, for example via a Web server or other access provider (not shown) executing on one of the other computing systems 460, accessible over the network 450.

The label generation engine 411 manages the generation of shipping labels. Generating shipping labels may include obtaining information about a particular shipment (e.g., a destination shipping address), and creating and/or managing data structures or other information used to facilitate, track, or otherwise represent the shipment. Generating shipping labels may also include determining and/or generating a representation of a shipping label (e.g., a bit map, a printer definition language file, an image file, etc.) and providing such a representation to some output device (e.g., a printer, a network interface, etc.). The label generation engine 411 may further provide information about generated shipping labels to other modules, such as the shipment management system 455.

The user interface engine 412 provides a view and a controller that facilitates user interaction with the SLPS 410. The user interface engine 412 may, for example, provide an interactive graphical user interface such as the one described with reference to FIG. 3D. In other embodiments, such as when the SLPS 410 is deployed as a server-based application, the user interface engine 412 may provide a Web interface that may be accessed by remote client computing systems executing Web browsers.

The SLP API 413 provides programmatic access to one or more functions of the SLPS 410. For example, the SLP API 413 may provide an interface that provides one or more functions that may be called by one of the other programs 430 in order to produce a shipping label in an automated or semi-automated manner.

The SLP data repository 415 records information about shipments made via the SLPS 410, as well as information related to the operation of the SLPS 410 generally. Such information may include shipping records, user preferences, application settings (e.g., shipper return address, default carrier, etc.), account information (e.g., shipper accounts with one or more carriers), etc.

In an example embodiment, components/modules of the SLPS 410 are implemented using standard programming techniques. For example, the SLPS 410 may be implemented as a "native" executable running on the CPU 403, along with one or more static or dynamic libraries. In other embodiments, the SLPS 410 may be implemented as instructions processed by virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above may also use well-known or proprietary synchronous or asynchronous client-sever computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an SLPS implementation. Also, other steps could be implemented for each routine, and in different orders, and in different routines, yet still achieve the functions of the SLPS.

In addition, programming interfaces to the data stored as part of the SLPS 410 (e.g., in the data repository 415) can be available by standard means such as through C, C++, C#, and Java APIs; libraries for accessing files, databases, or other data repositories; through scripting languages such as XML; or through Web servers, FTP servers, or other types of servers providing access to stored data. The data repository 415 may be implemented as one or more database systems, file systems, or any other method known in the art for storing such information, or any combination of the above, including implementation using distributed computing techniques.

Also the example SLPS 410 may be implemented in a distributed environment comprising multiple, even heterogeneous, computer systems and networks. For example, in one embodiment, the label generation engine 411, the user interface engine 412, the SLP API 413, and the SLP data repository 415 are all located in physically different computer systems. In another embodiment, various modules of the SLPS 410 are hosted each on a separate server machine and may be remotely located from the tables which are stored in the SLPS data repository 415. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.). Other variations are possible. Also, other functionality could be provided by each component/module, or existing functionality could be distributed amongst the components/modules in different ways, yet still achieve the functions of an SLPS.

Furthermore, in some embodiments, some or all of the components of the SLPS may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, such as media 405, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 5:
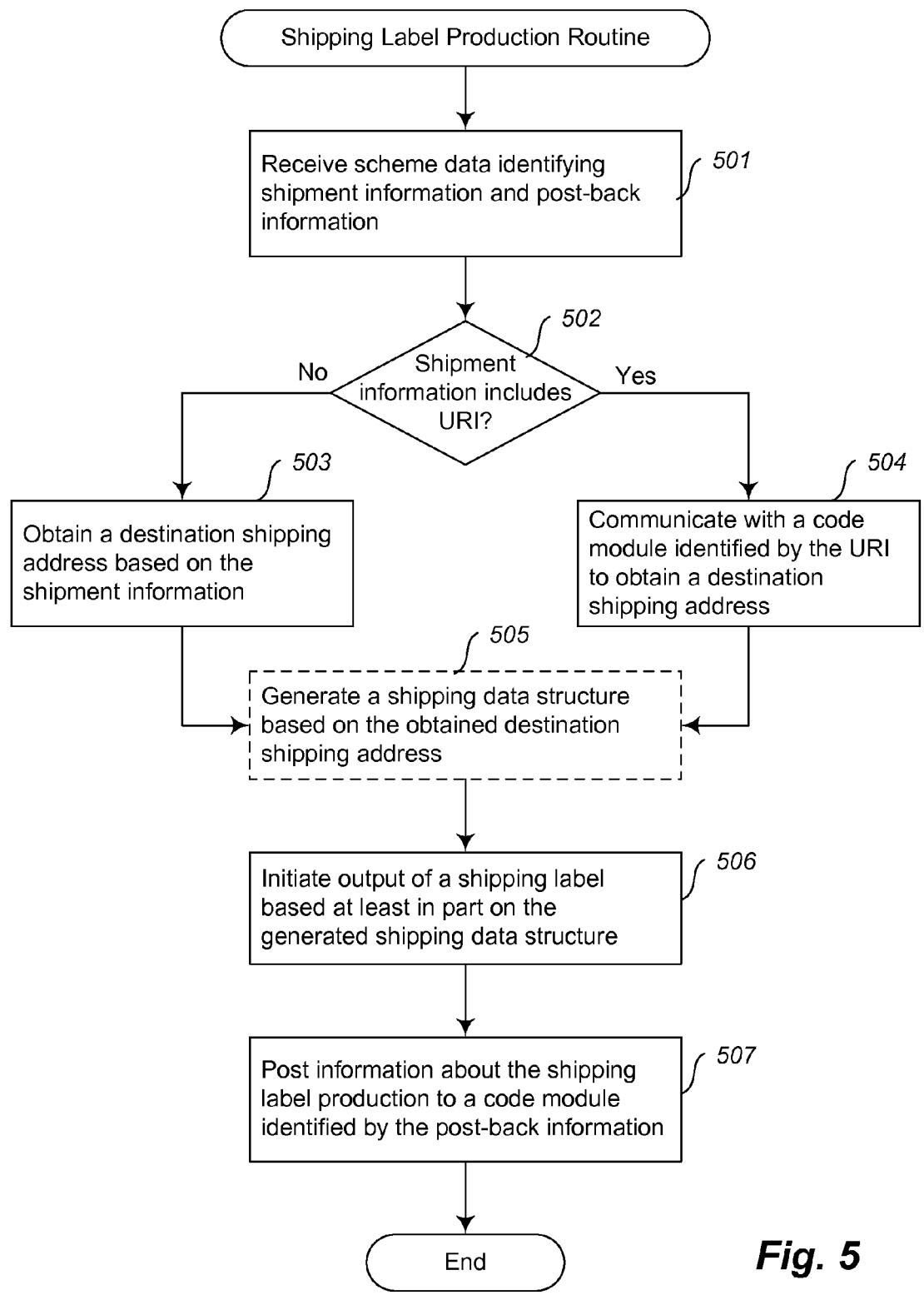
FIG. 5 is an example flow diagram of an example shipping label production routine provided by an example embodiment of a Shipping Label Production System.

FIG. 5 is an example flow diagram of an example shipping label production routine provided by an example embodiment of a Shipping Label Production System. The illustrated routine may be performed by the SLPS 104, described with reference to FIG. 1 to produce, for example, the shipping label described with reference to FIG. 3E. The illustrated process demonstrates production of a shipping label based on shipment information received in a shipping URL by, for example, a Web browser executing on a client computing system.

More specifically, at step 501, the routine receives scheme data identifying shipment information and post-back information. In one embodiment, the routine may receive the scheme data from a Web browser configured to execute the routine in response to a user selection of a link or other user interface control that represents a shipping URI. In another embodiment, the routine may receive the scheme data from a file or other data source, such as when the routine is part of an SLPS configured to automatically produce multiple shipping labels in batch mode. In a further embodiment, a shipping URI may be used to indicate a file that contains shipment information, post-back information, and/or other shipping URIs that are to be processed.

In step 502, the routine determines whether the shipment information identified by the scheme data includes a URI (an embedded URI), and if not proceeds to step 503, else proceeds to step 504. In step 503, the routine obtains a destination shipping address based on the shipment information. For example, the destination shipping address may be embedded directly in the scheme data received in step 501, as illustrated in FIG. 3C.

In step 504, the routine communicates with a code module identified by the included URI to obtain a destination shipping address. The code module may be, for example, an address management engine, as described with reference to FIG. 1. The code module may reside in various places and execute under the control of various parties. For example, the code module may execute on a remote computing system, such as a remote Web server executing an electronic commerce application (e.g., an online store, an auction Web site, etc.). In other embodiments, the code module may execute on the same client system that executes the routine, such as a local contact manager application.

In step 505, the routine generates a shipping data structure based on the destination shipping address obtained in steps 503 or 504. Generating a shipping data structure may include creating, determining, updating, or otherwise managing data structures, records, and/or indicators of information about a particular shipment, such as updating one or more records in the SLP data repository 415, described with reference to FIG. 4. Generating the shipping data structure may also include processing the obtained destination shipping address in various ways, such as by applying one or more style sheets configured to transform an XML representation of the destination shipping address into a printable form. In some embodiments, step 505 may be optional, in that an explicit shipping data structure may not be generated and/or constructed. Instead, a previously generated shipping data structure stored in a data repository may simply be referenced. Alternatively, at least some of the functions discussed with reference to step 505 may be performed in the context of steps 506 and/or 507, below, possibly without reference to a shipping data structure, explicit or implicit.

In step 506, the routine initiates output of a shipping label based at least in part on the generated shipping data structure. Outputting the shipping label may include generating a digital representation of the shipping label (e.g., a bit map, an image file, etc.), printing the shipping label, sending the shipping label (e.g., via email), recording the shipping label (e.g., in a data repository), etc.

In step 507, the routine posts information about the shipping label production to a code module identified by the post-back information. As discussed above, the post-back information may include a URI that identifies a code module, such as the shipment information data engine 107 described with reference to FIG. 1. In some embodiments, the post-back information may include multiple URIs that are each used for different purposes. For example, the post-back information may include a first URI that is used to provide information to one code module when the shipping label has been successfully produced, and a second URI that is used to provide information to another code module when an error condition occurs, such as when the shipping label is not successfully produced (e.g., a printer error, a shipping account is invalid, an address cannot be verified, etc).

In addition, the post-back information may include or otherwise specify one or more fields, parameters, or other identifiers of data items that are to be reported to the code module, such as aspects of the generated shipping data structure and/or the produced shipping label (e.g., a tracking number, a date, a shipping cost, etc.). In some embodiments, the post-back information may not include a URI or other identifier of a code module. Instead, the identity of the code module may be determined in other ways, such as implicitly, based on the identity of a server that provided the initial shipping URI that caused the execution of the routine. Alternatively, the identity of the code module may be recorded as a setting or preference of the SLPS itself. Such a setting may be used as a default (e.g., when the shipping URI does not identify a shipment information data engine) or an override (e.g., a shipment information data engine to use regardless of any shipment information data engine identified by the shipping URI). After step 507, the routine ends. In other cases, the post-back information, including the identity of a code module, may be obtained from the same data, URI, or link used to obtain shipment information. It may also be obtained at the same time the shipment information is obtained (see step 504).

Figure 6:
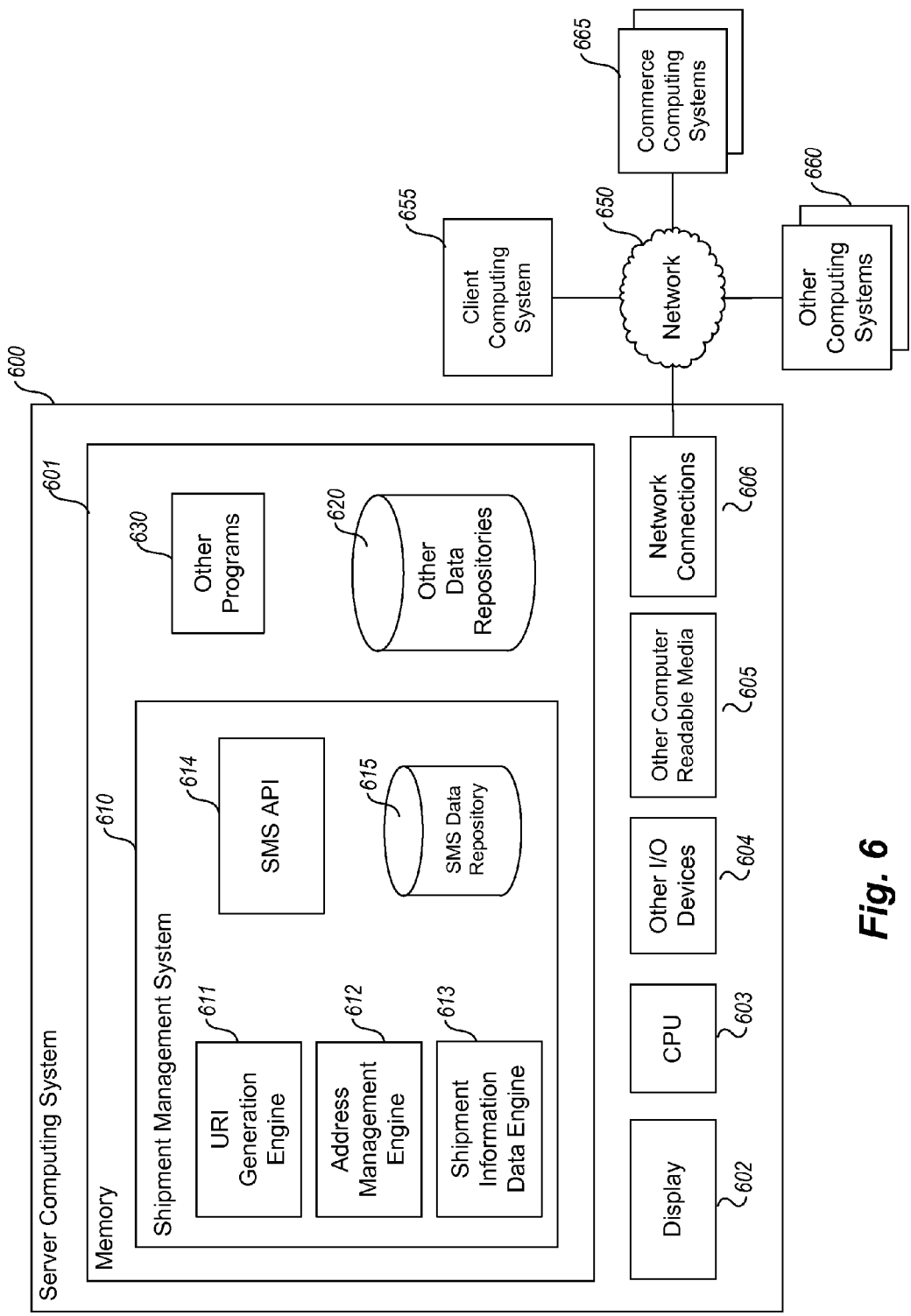
FIG. 6 is an example block diagram of a computing system for practicing embodiments of a Shipment Management System.

FIG. 6 is an example block diagram of a computing system for practicing embodiments of a Shipment Management System. Note that a general purpose or a special purpose computing system may be used to implement an SMS. Further, the SMS may be implemented in software, hardware, firmware, or in some combination to achieve the capabilities described herein.

The computing system 600 may comprise one or more server and/or client computing systems and may span distributed locations. In addition, each block shown may represent one or more such blocks as appropriate to a specific embodiment or may be combined with other blocks. Moreover, the various blocks of the SMS 610 may physically reside on one or more machines, which use standard (e.g., TCP/IP) or proprietary interprocess communication mechanisms to communicate with each other.

In the embodiment shown, computer system 600 comprises a computer memory ("memory") 601, a display 602, one or more Central Processing Units ("CPU") 603, Input/Output devices 604 (e.g., keyboard, mouse, CRT or LCD display, etc.), other computer-readable media 605, and network connections 606. The SMS 610 is shown residing in memory 601. In other embodiments, some portion of the contents, some of, or all of the components of the SMS 610 may be stored on or transmitted over the other computer-readable media 605. The components of the SMS 610 preferably execute on one or more CPUs 603 and manage the production of shipping labels, as described herein. Other code or programs 630 and potentially other data repositories, such as data repository 620, also reside in the memory 610, and preferably execute on one or more CPUs 603. Of note, one or more of the components in FIG. 6 may not be present in any specific implementation. For example, some embodiments embedded in other software many not provide means for user input or display.

In a typical embodiment, the SMS 610 includes URI generation engine 611, an address management engine 612, a shipment information data engine 613, a shipment management system application program interface ("SMS API") 614, and a shipment management system data repository 615. Other and/or different modules may be implemented. In addition, the SMS 610 may interact via a network 650 with a client computing system 655, commerce computing systems 665, and other computing systems 660. The client computing system 655 may, for example, execute an SLPS as described with reference to FIG. 4. The SMS 610 may interact with an SLPS on the client computing system 655 via a Web server executing as one of the other programs 630. Also, the SMS data repository 615 may be provided external to the SMS 610 as well, for example via a Web server or other access provider (not shown) executing on one of the other computing systems 660, accessible over the network 650.

The URI generation engine 611, the address management engine 612, and the shipment information data engine 613 respectively correspond to the URI generation engine 105, the address management engine 106, and the shipment information data engine 107, described with respect to FIG. 1.

As discussed with reference to the SLPS of FIG. 4, the SMS 610 may similarly be implemented in various ways and/or using various known or proprietary techniques. In particular, the SMS 610 may be implemented in hardware, software, and/or firmware. Software portions of the SMS 610 may be implemented using one or more programming languages and associated tools (e.g., compilers, interpreters, linkers, etc.) to generate code portions (e.g., instruction sequences) that may be processed by hardware components (e.g., a CPU) and/or software components (e.g., a virtual machine). In addition, the SMS 610 may be decomposed, if at all, using various techniques, including client-server architectures, N-tier architectures, Web Services (e.g., SOAP), classes, libraries, archives, etc.

Figure 7:
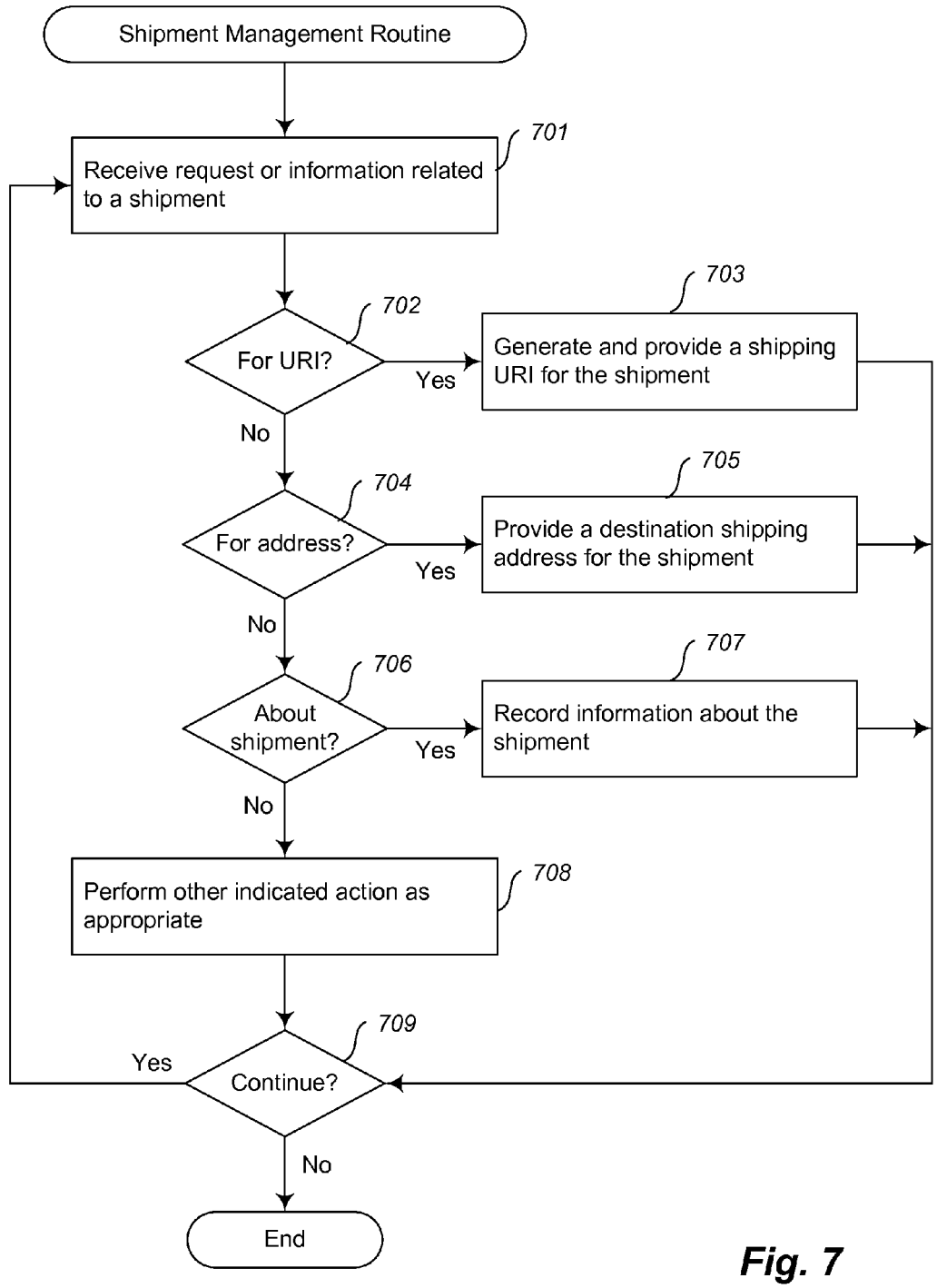
FIG. 7 is an example flow diagram of an example shipment management routine provided by an example embodiment of a Shipment Management System.

FIG. 7 is an example flow diagram of an example shipment management routine provided by an example embodiment of a Shipment Management System. The illustrated routine may be performed by the SMS 102, described with reference to FIG. 1 to provide shipment management functionality to one or more SLPSs, such as URI generation, address management, and/or shipment tracking. In steps 701-709, the routine performs a loop in which it repeatedly processes received requests or information related to shipments.

More specifically, at step 701, the routine receives a request or information related to a shipment. The request or information may be received from, for example, a Web browser or an SLPS. The shipment may be identified in various ways, such as by an order identifier, a recipient identifier, an item identifier, etc. In some embodiments, the routine may execute one or more access control techniques at this point, such as checking whether the received request or information was accompanied by one or more tokens (e.g., cookie, password, passkey, username, etc.) configured to enable access to the functionality provided by the routine.

In step 702, the routine determines whether a request for a shipping URI was received, and if so, proceeds to step 703, else proceeds to step 704. In step 703, the routine generates and provides a shipping URI for a shipment that corresponds to the request. Generating the shipping URI may include dynamically generating the shipping URI based on various factors, such as the identity of the party making the request, the identity of the recipient of the item, a shipment identifier, the capabilities of a particular SLPS, etc. A generated shipping URI may be provided (e.g., transmitted, sent, forwarded, etc.) to an SLPS in order to cause the SLPS to produce a shipping label in accordance with the generated shipping URI. In some embodiments, generated shipping URIs may be provided to other components of the SMS, such as a data repository, such that the generated shipping URIs may be utilized at a later time. The routine then proceeds to step 709.

In step 704, the routine determines whether a request for a destination shipping address was received, and if so, proceeds to step 705, else proceeds to step 706. In step 705, the routine provides a destination shipping address for the shipment that corresponds to the request. The destination shipping address may be obtained by the routine from, for example, the SMS data repository 615 of FIG. 6, based on an identifier (e.g., an order identifier) provided along with the request. In some embodiments, the destination shipping address may be formatted in accordance with an address format specification (e.g., an XML specification for mailing addresses). The routine then proceeds to step 709.

In step 706, the routine determines whether information about a shipment was received, and if so, proceeds to step 707, else proceeds to step 708. In step 707, the routine records information about the shipment. Recording information about the shipment may include storing one or more data items (e.g., a tracking number, a status code, an error message, a parcel weight, etc.) in the SMS data repository 615 of FIG. 6. The routine then proceeds to step 709.

In step 708, the routine performs other indicated actions as appropriate. Other actions may include, for example, providing information about the status of a shipment (e.g., whether and/or when the shipment was shipped or received), deleting information about one or more shipments, etc.

In step 709, the routine determines whether to continue, and if so, continues the loop of 701-709, else ends.

In one embodiment, a shipping protocol is provided. A shipping protocol defines a syntax for well-formed shipping URIs and the corresponding item shipment actions (e.g., shipping label generation and/or output) taken by a compliant SLPS in response to a well-formed shipping URI. One example syntax for a shipping URI is:

```
[shippingURI]    := ship://[property_list]
[property_list]  := [property] |
                    [property]?[property_list]
[property]       := [property_name]=[property_value]
[property_name]  := GETURI |
                    POSTURI |
                    ADDR |
                    TRANSFORM |
                    POST_METHOD |
                    POSTBACK_FAIL
[property_value] := [encoded_string]
```

In this example, a shipping URI comprises the text string "ship," followed by the text string "://" followed by a list of properties. In the illustrated example, the text string "ship" identifies the described shipping protocol. In other embodiments, other identifiers may be used, such as "shipto," "slpp" ("Shipping Label Production Protocol"), etc. A list of properties is one or more properties, separated by the "?" character. Each property is a key-value pair comprising a property name, followed by the "=" character, followed by a property value. A property may specify an action to be taken by the SLPS and/or a property of a shipping label that is to be produced. Allowed property names in the example protocol include GETURI, POSTURI, ADDR, TRANSFORM, POST_METHOD, and POSTBACK_FAIL. Other protocols may include a greater or lesser number of properties and/or different property names. A property value is any URI encoded string.

Table 1, below, describes the semantics and/or purpose of each of the properties defined by an example shipping protocol.

TABLE 1

| Property | Example Semantics/Purpose |
| --- | --- |
| GETURI= [URI] | To specify a URI which may be used by a SLPS to obtain a destination shipping address from a code module identified by the URI and/or to provide a location of a module to be used by a SLPS to provide post-back information. |
| POSTURI= [URI] | To specify a URI which may be used by a SLPS to provide information about an item shipment to a code module identified by the URI. |
| ADDR= [address] | To specify a destination shipping address, such as by an XML string or plain text. |
| TRANSFORM= [URI] | To specify a URI which identifies a style sheet which may be used to transform a destination shipping address into a printable representation. |
| POST_METHOD= [METHOD] | To specify an HTTP method (e.g., GET or POST) to use when obtaining a destination shipping address and/or providing information about an item shipment. |
| POSTBACK_FAIL= [URI] | To specify a URI which may be used by an SLPS to provide information about an error condition related to an item shipment to a code module identified by the URI. |

Table 2, below, provides examples for each of the properties defined by an example shipping protocol. Note that for readability, the examples of Table 2 have in some cases been broken across multiple lines. In typical embodiments, the illustrated properties would not include newline characters or be broken over several lines, as illustrated.

TABLE 2

| Property | Example(s) |
| --- | --- |
| GETURI= [URI] | GETURI=http://a.com/order-lookup?OrderNum=1234&AccessToken=abc1 |
| POSTURI= [URI] | POSTURI=http://a.com/ship-post?OrderNum=1234&AccessToken=abc1&TrackingNum=%TrackingNum%&ShippingCost=%ShippingCost%&ShipmentDate=%ShipmentDate%&Weight=%Weight%&Carrier=%Carrier% |
| ADDR= [address] | ADDR=<address><br><recipient>Mr. Buyer</recipient><br><street>123 Easy St.</street><br><city>Chicago</city><br><state>IL</state> |

TABLE 2-continued

| Property | Example(s) |
| --- | --- |
| | <zip>60137</zip><br></address> |
| TRANSFORM= [URI] | TRANSFORM=http://a.com/Transform.xsl<br>TRANSFORM=file:///Transform.xsl |
| POST_METHOD= [METHOD] | POSTMETHOD=HTTP_POST<br>POSTMETHOD=HTTP_GET<br>POSTMETHOD=FTP_PUT |
| POSTBACK_FAIL= [URI] | POSTBACK_FAIL=http://a.com/postfailed?OrderNum=1234&ErrorMessage=%ErrorMessage% |

In the example shipping protocol, property values may include one or more fields that each refer to aspects of an item shipment and/or a produced shipping label. These fields are specified as text strings surrounded by the "%" character. In other embodiments, other delimiters may be utilized (e.g., "$", "?", "!", etc.) Table 3, below, describes various fields and their semantics. Other fields and/or semantics can be similarly supported.

TABLE 3

| Field | Example Semantics |
| --- | --- |
| %TrackingNum% | A tracking number associated with the shipment (e.g., as provided by a carrier service) |
| %ShippingCost% | The cost of the shipment |
| %ShipmentDate% | The date that the item was shipped (e.g., provided to a carrier service) |
| %Carrier% | A name or other identifier of a carrier for the shipment (e.g., United Parcel Service, Federal Express, U.S. Postal Service, etc.) |
| %CarrierService% | A type of service used to ship the item (e.g., next day, weekend delivery, etc.) |
| %Weight% | The weight of the shipment |
| %Dimensions% | One or more dimensions of a parcel, envelope, or other packing materials used to ship the item |
| %ErrorMsg% | An error message or code associated with the item shipment (e.g., that the label did not print correctly, that a destination shipping address could not be verified) |

TABLE 3-continued

| Field | Example Semantics |
|---|---|
| %LabelPrintDate% | The date and/or time on which the shipping label was printed |
| %ShipmentStatus% | The status of the shipment (e.g., label printed, awaiting pickup, picked up, etc.) |
| %TransitTime% | The real or estimated time in transit for the shipment |

In a typical embodiment, a SLPS will replace each field in a given property value of a shipping URI (i.e., substitute a given field) with the appropriate data item from the corresponding item shipment and/or shipping label. For example, if a TrackingNum field occurs in a POSTURI, the SLPS will replace the string "% TrackingNum %" with an actual tracking number from the corresponding item shipment and/or shipping label. This string replacement will typically occur prior to the use of the POSTURI in order to provide information to a code module identified by the POSTURI about the corresponding item shipment.

All of the above U.S. patents, U.S. patent application publications, U.S. patent applications, foreign patents, foreign patent applications and non-patent publications referred to in this specification and/or listed in the Application Data Sheet, including but not limited to U.S. Pat. No. 7,409,353, issued Aug. 5, 2008, entitled "Methods and Systems for Producing Shipping Labels;" U.S. Patent Application No. 61/019,208, filed Jan. 4, 2008, entitled "Methods and Systems for Supporting the Production of Shipping Labels;" U.S. patent application Ser. No. 12/169,509, filed Jul. 8, 2008, entitled "Methods and Systems for Producing Shipping Labels;" and U.S. patent application Ser. No. 12/347,660, filed Dec. 31, 2008, entitled "Methods and Systems for Supporting the Production of Shipping Labels" are incorporated herein by reference, in their entireties.

From the foregoing it will be appreciated that, although specific embodiments have been described herein for purposes of illustration, various modifications may be made without deviating from the spirit and scope of the present disclosure. For example, the methods and systems for producing shipping labels discussed herein are applicable to other architectures other than an electronic commerce order management architecture. As noted, the described techniques may be used for any carrier/mail communication, such as direct mail operations, mail merges, etc. Also, the methods and systems discussed herein are applicable to differing shipping and/or networking protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer-implemented method in a server computing system for facilitating the production of a shipping label, the method comprising:
    causing the shipping label to be produced by a client computing system that is separate and remote from the server computing system, by,
        transmitting, to the client computing system, a first uniform resource identifier comprising a scheme name and scheme data, the scheme name identifying a shipping protocol and configured to cause a shipping label module to be executed on the client computing system, the scheme data including a second uniform resource identifier that identifies a first code module that is separate and remote from the client computing system, the shipping label module configured, upon execution, to produce the shipping label in accordance with the identified shipping protocol by:
            communicating, based on the second uniform resource identifier, with the remote first code module to obtain information for production of the shipping label and/or for transmission of information about the production of the shipping label; and
            initiating output of the shipping label based at least in part on the scheme data.

2. The method of claim 1, further comprising:
    receiving a request from the shipping label module, the request based on the second uniform resource identifier; and
    transmitting, to the shipping label module, shipment information including a destination shipping address for use in the production of the shipping label.

3. The method of claim 1, further comprising:
    receiving a request from the shipping label module, the request based on the second uniform resource identifier; and
    transmitting, to the shipping label module, post-back information for use in the transmission of the information about the production of the shipping label.

4. The method of claim 3 wherein the transmitted post-back information includes a third uniform resource identifier that identifies a second code module that is separate and remote from the client computing system, the third uniform resource identifier used by the shipping label module in the transmission of the information about the production of the shipping label.

5. The method of claim 1, further comprising:
    receiving a request from the shipping label module, the request based on the second uniform resource identifier; and
    transmitting, to the shipping label module, XML data for use in the communicating with the remote first code module.

6. The method of claim 1 wherein the scheme data specifies one or more data items that are determined by the shipping label module, and wherein the method further comprises receiving the determined data items from the shipping label module, the determined data items including at least one of a tracking number, a shipping cost, a shipment date, a shipment status, a parcel weight, parcel dimensions, an indicator of a shipping service, a shipping label print date, a transit time, shipment charges, or a shipping carrier name.

7. The method of claim 1, further comprising:
    receiving from the client computing system, a request for information about an order; and
    in response to the received request, automatically generating the first uniform resource identifier for transmitting to the client computing system.

8. A computer-readable memory medium containing instructions for controlling a server computing system to facilitate the production of a shipping label by performing a method comprising:

causing the shipping label to be produced by a client computing system that is separate and remote from the server computing system, by, transmitting, to the client computing system, a first uniform resource identifier comprising a scheme name and scheme data, the scheme name identifying a shipping protocol and configured to cause a shipping label module to be executed on the client computing system, the shipping label module configured, upon execution, to produce the shipping label in accordance with the shipping protocol by:

initiating output of the shipping label based at least in part on shipment information identified by the scheme data; and automatically posting information about the produced shipping label back to a computing system remote and separate from the client computing system, based at least in part on post-back information identified by the scheme data.

9. The computer-readable memory medium of claim 8 wherein the scheme data identifies the shipment information by including a destination shipping address, and wherein the shipping label module is further configured, upon execution, to produce the shipping label by printing the shipping label such that the shipping label includes the destination shipping address.

10. The computer-readable memory medium of claim 8, the method further comprising:

receiving information about the production of the shipping label; and recording an indication that an order associated with the shipping label has been shipped.

11. The computer-readable memory medium of claim 8 wherein the scheme data identifies the shipment information by including a shipment identifier, and wherein the method further comprises:

receiving a request from the shipping label module, the request including the shipment identifier; and transmitting, to the shipping label module, a destination shipping address associated with the shipment identifier.

12. The computer-readable memory medium of claim 8, wherein the scheme data identifies the post-back information by including an identifier that identifies the computing system remote and separate from the client computing system, the identified computing system remote and separate from the client computing system configured, upon execution, to record an indication that the shipping label has been produced.

13. The computer-readable memory medium of claim 8, the method further comprising:

including a network resource identifier in the scheme data of the first uniform resource identifier transmitted to the client computing system, the network resource identifier identifying a resource that provides, to the shipping label module, the shipment information identified by the scheme data and/or the post-back information identified by the scheme data.

14. The computer-readable memory medium of claim 13 wherein the network resource identifier is a second uniform resource identifier.

15. The computer-readable memory medium of claim 13 wherein the network resource identifier identifies a code module that is remote and separate from the client computing system, the code module configured, upon execution, to provide, to the shipping label module, the shipment information identified by the scheme data and/or the post-back information identified by the scheme data.

16. The computer-readable memory medium of claim 8, the method further comprising:

including a file identifier in the scheme data of the first uniform resource identifier transmitted to the client computing system, the file identifier identifying a file, the identified file identifying the shipment information identified by the scheme data and/or the post-back information identified by the scheme data.

17. The computer-readable memory medium of claim 16 wherein the identified file includes a second uniform resource identifier that identifies a code module that is remote and separate from the client computing system, the code module configured, when upon execution, to provide shipment data to the shipping label module and/or to record an indication that the shipping label has been produced.

18. A shipment management computing system configured to facilitate the production of a shipping label, comprising:

a processor;

a memory, communicatively coupled to the processor; and a shipment management module stored on the memory that is configured, upon execution, to cause the shipping label to be produced by a client computing system that is separate and remote from the shipment management computing system, the shipment management module including instructions configured, upon execution, to:

generate a uniform resource identifier comprising a scheme name and scheme data, the scheme name identifying a shipping protocol and configured to cause the client computing system to execute, on the client computing system, a shipping label module that implements the identified shipping protocol, the shipping label module configured to:

produce the shipping label, in accordance with the shipping protocol and by using the scheme data; and using the scheme data, automatically post to the shipment management computing system information about the produced shipping label; and transmit the generated uniform resource identifier to the client computing system.

19. The shipment management computing system of claim 18 wherein the shipment management module stored on the memory is further configured, upon execution, to:

receive from the shipping label module the information about the produced shipping label.

20. The shipment management computing system of claim 18 wherein the scheme data identifies shipment information by including a shipment identifier, and wherein the shipment management module stored on the memory is further configured, upon execution, to:

receive a request from the shipping label module, the request including the shipment identifier; and transmit, to the shipping label module, a destination shipping address associated with the shipment identifier.

* * * * *